No. 832,845. PATENTED OCT. 9, 1906.
W. P. COLLINS.
INSECT TRAP.
APPLICATION FILED MAY 10, 1905.

Witnesses:
A. M. Maxwell
John F. Wade

Inventor:
William P. Collins.
By Arthur C. Brown
Att'y

UNITED STATES PATENT OFFICE.

WILLIAM P. COLLINS, OF PLEASANT HILL, MISSOURI.

INSECT-TRAP.

No. 832,845.  Specification of Letters Patent.  Patented Oct. 9, 1906.

Application filed May 10, 1905. Serial No. 259,842.

*To all whom it may concern:*

Be it known that I, WILLIAM P. COLLINS, a citizen of the United States, residing at Pleasant Hill, in the county of Cass and State of Missouri, have invented a new and useful Insect-Trap, (the object of which is to attract to and compel to enter without waiting for them to seek an entrance or to enter of their own volition,) of which the following is a specification.

My present invention relates to insect-traps, and more particularly to a device of the class described comprising an insect-receptacle and mechanical means for drawing insects thereinto.

The object of my invention is to provide a device of the class described which is simple and economical in construction and comprises the improved details of structure which will presently be fully described, and pointed out in the claims, reference being had to the accompanying drawings, forming part of this specification, in which like reference-numerals refer to like parts throughout the several views, and in which—

Figure 1:
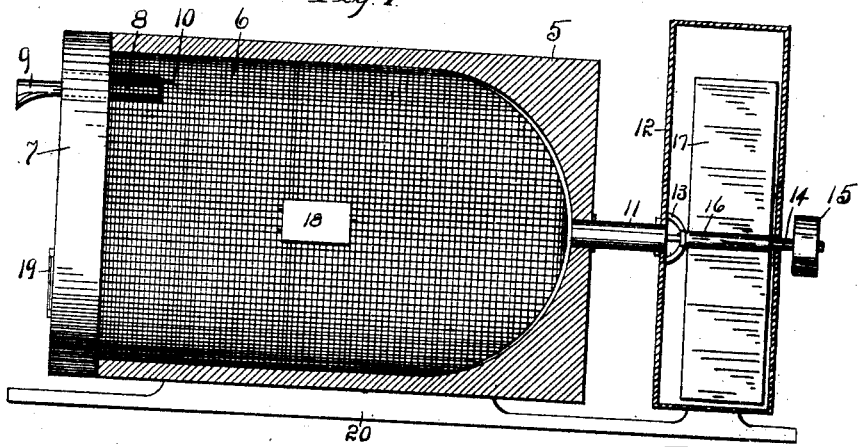
Figure 2:
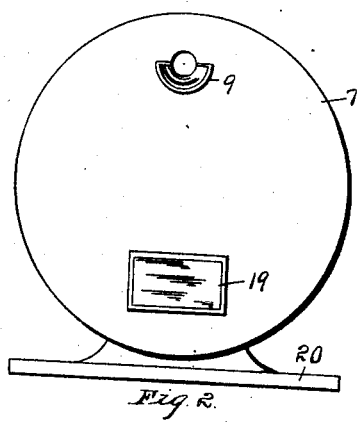
Figure 3:
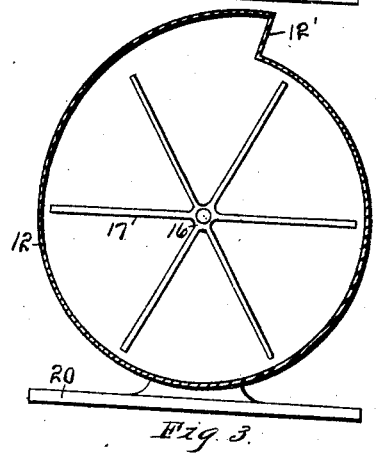
Figure 4:
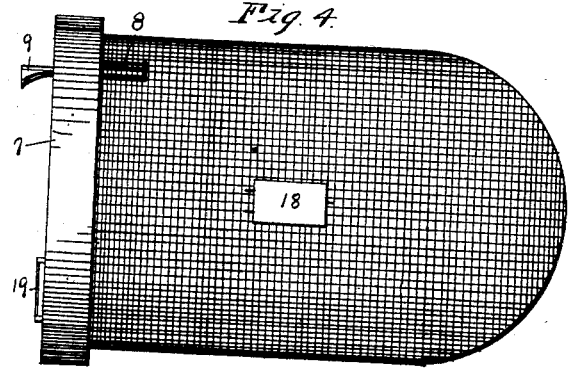

Figure 1 is a side elevation of a device constructed according to my invention, the trap and fan casings being in central vertical section to better illustrate the parts. Fig. 2 is an end view of the trap. Fig. 3 is a transverse vertical section of the fan-box. Fig. 4 is a detail view, in side elevation, of the insect-receptacle.

Referring more in detail to the parts, 5 represents the trap-box, which may be composed of any suitable material and is recessed longitudinally to receive the insect-receptacle 6, said receptacle being preferably formed of wire-gauze and carried by a head-block 7, which latter engages the end of the trap-box 5. Extending through head 7 is a tube 8, having a flaring outer platform 9 and provided on its inner end with a cover 10, which is normally lowered over the end of the tube, as indicated in Fig. 4. Extending through the closed end of the trap-box is a tube 11, of leather, rubber, or similar material, which is connected at its outer end with the fan-box 12. Extending through said fan-box and journaled in suitable bearings in the interior bracket 13 and the side of said box is a shaft 14, carrying the pulley-wheel 15. Rigidly mounted on said shaft within the box is a fan 16, having blades 17 of a suitable number and design. In the receptacle 6 is a door 18, through which the insects are removed, and 19 is a window in the head 7, through which the contents of the receptacle may be observed or through which a suitable light contained within the receptacle may shine for the purpose of attracting insects at night. 20 is a pedestal on which the trap and fan boxes are mounted.

In the operation of my device the parts are arranged as shown and described and a belt connected with a suitable motive power run over the drive-pulley 15. Upon the fan being started in operation a suction is formed in the fan-box, which draws the air through the tube 11 and forces it out through the exit 12', which action tends to swing the cover 10 of tube 8 inwardly, providing access for the air to the interior of the receptacle.

Insects are attracted by means of bait placed on platform on the outer end of the tube 8 and when alighting upon or approaching said platform are drawn into the receptacle by means of the suction created by the fan.

When it is desired to empty the trap, the gauze receptacle is withdrawn from the box, the door 18 opened, and contents removed, after which the parts may be easily replaced. By having the tube connecting the frame-box and the body of the trap resilient the jar or motion caused by the revolution of the fan will have no effect on the connected parts.

Although I have shown a common form of fan and a preferred form of fan-box, these parts, as well as others which are shown, may be altered without departing from the spirit of my invention.

Having thus described my invention, what I claim as new therein, and desire to secure by Letters Patent, is—

1. In a device of the class described, an insect-receptacle having an opening in one of its ends, a hinged cover adapted to close said opening, and means for drawing a current of air through said opening, for the purpose set forth.

2. A device of the class described comprising a recessed body, a receptacle fitting within the recess in said body, and having an opening in its outer end, and means connected with said body for drawing a current of air through said receptacle.

3. In a device of the class described, a recessed body, a mesh receptacle located within the recess in said body, a head on said receptacle having an opening therein, and means for drawing a current of air through said opening.

4. In a device of the class described the combination of a recessed body, an insect-receptacle fitting within the recess in said body, a suitable head on said receptacle having an opening therein, a fan-box carrying a suitable fan, and a tube extending through the solid end of said body and connected with said fan-box, substantially as and for the purpose set forth.

5. In a device of the class described, the combination of a recessed body, a mesh receptacle fitting within the recess in said body, and having a solid head fitting against the end of said body, a tube extending through said head and forming a platform without the receptacle, a tube extending through said body opposite said receptacle-head, and means connected with said second tube for drawing a current of air through said receptacle, substantially as and for the purpose set forth.

In testimony whereof I have signed my name to this specification in the presence of two subscribing witnesses.

WILLIAM P. COLLINS.

Witnesses:
B. W. RYKER.
N. BURRUS,